Fig. 1

June 16, 1959 — O. FROLAND — 2,891,122
SWITCH OPERATING MEANS
Filed Nov. 14, 1955 — 9 Sheets-Sheet 2

INVENTOR.
Olav Froland
BY Ralph G. Hohenfeldt
Attorney

June 16, 1959 — O. FROLAND — 2,891,122
SWITCH OPERATING MEANS
Filed Nov. 14, 1955 — 9 Sheets-Sheet 3

INVENTOR.
Olav Froland
BY Ralph G. Hohenfeldt
Attorney

O. FROLAND

2,891,122

SWITCH OPERATING MEANS

Filed Nov. 14, 1955

INVENTOR.
Olav Froland
BY Ralph G. Hohenfeldt
Attorney

June 16, 1959 O. FROLAND 2,891,122
SWITCH OPERATING MEANS
Filed Nov. 14, 1955 9 Sheets-Sheet 7

INVENTOR.
Olav Froland
BY Ralph G. Hohenfeldt
Attorney

June 16, 1959

O. FROLAND 2,891,122

SWITCH OPERATING MEANS

Filed Nov. 14, 1955

INVENTOR.
Olav Froland
BY
Attorney

United States Patent Office 2,891,122
Patented June 16, 1959

2,891,122

SWITCH OPERATING MEANS

Olav Froland, Milwaukee, Wis., assignor to McGraw-Edison Company, a corporation of Delaware Application November 14, 1955, Serial No. 546,605

8 Claims. (Cl. 200—92)

This invention relates to electric switches and more particularly to motor or manually actuated means for operating such switches from a remote or proximate station.

Certain electrical installations require a switch which may be periodically opened or closed from a remote position. Familiar examples are seen where it is desired to accomplish line sectionalizing, transferring of load between preferred and auxiliary feeders, and the switching of high capacity power factor corrective capacitor banks. In such instances it is necessary that the main current carrying circuits be controlled by a relatively small power input switch actuator which performs its function in response to a relatively low energy electric signal.

The switch and operating means constituting the instant invention are used to advantage where, during closure of the main switch, there are high inrush currents accompanied by generation of gases and inordinate magnetic forces which tend to blow open the main switch contacts. For example, in switching paralleled capacitor banks, a very heavy current sometimes flows between the switch contacts even before they are closed. This prestrike phenomenon is likely to be accompanied by generation of severe magnetic forces in the vicinity of the switch contacts and also by evolution of gases which may develop forces large enough to prevent switch closure or even to explode the switch housing. Under such circumstances, a rapid, positive acting main switch actuator, such as that hereinafter described, is desirable if not indispensable.

Accordingly, this invention has as one of its principal objects the provision of a switch actuator capable of rapidly operating a high inertia main switch.

A further object is to provide switch actuating means with quick opening and quick closing characteristics and which may be conveniently operated remotely by electric signal means or in proximity by manual means, and which when manually operated is free of any restraint by the automatic electric means.

A further object of this invention is to impress the actuator with energy storing features so that this energy may be availed of in immediate response to an electric control signal and in response to manual control if electric control fails.

Yet another object of this invention is the provision of a switch actuator which simultaneously stores energy for performing both the switch closing and opening operations and wherein that energy is derived from a relatively low power input prime mover.

A more general object is to provide a new and improved switch construction.

Other specific objects will appear from time to time tthroughout the course of the following specification.

An embodiment of the invention is illustrated in the following drawings in which:

Fig. 11b represents the disposition of the toggle link mechanism and the switch opening springs of the actuator under conditions recited with reference to Fig. 11a;

Fig. 14b represents the disposition of the toggle link mechanism and the switch opening springs of the actuator under conditions recited with respect to Fig. 14a;

In general terms, the invention utilizes a single or polyphase main switch having a torque shaft extending for connection to the novel, remote or manual switch actuator. The associated actuator has a relatively low voltage electric motor as its prime mover and is responsive to any control impulse or signal such as that which may be established through the contacts of a voltage sensitive induction disc relay. The motor power is supplied, through a gear train, to an over-running type clutch which drives a power shaft having cranks, which during approximately one half revolution simultaneously extend independent switch opening and closing springs. A toggle link mechanism interconnects one crank to a lever on the main switch torque shaft and after the crank shaft executes a one half revolution the toggle link member locks to become a rigid member capable of quickly transmitting the force released from the switch closing spring to the torque shaft operating lever. The toggle link member further restrains the switch opening springs from acting until an appropriate signal is applied.

By collapsing the toggle link member through the agency of manual or electromagnetic release mechanism, the energy stored in the opening spring may be released for expenditure upon the switch torque shaft thereby opening the main switch contacts with a quick action.

The actuator is also adapted for manual operation in the event that electric power is unavailable or for the purpose of testing.

An alternative embodiment of the invention includes the structure and characteristics mentioned in the preceding paragraph and in addition includes an instantaneous closing feature. In this structure the switch closing spring of the actuator and the opening springs are in maximum extended position even though the main switch contacts are in open position. Consequently, release of detent means which restrain the switch closing spring from acting closes the switch instantaneously.

Figure 1:
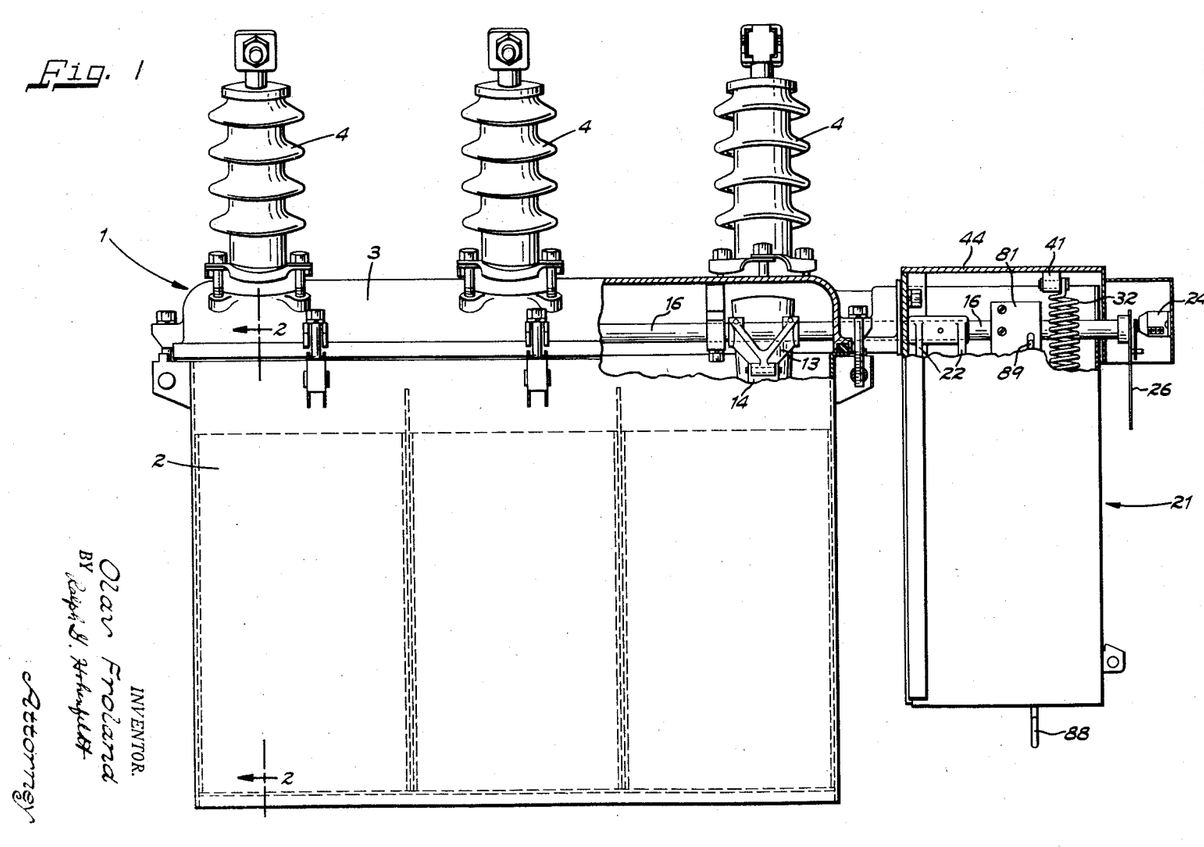
Fig. 1 is a side elevational view of an assembled main switch with parts broken away in conjunction with a similar view of the switch actuator of the instant invention.
Figure 2:
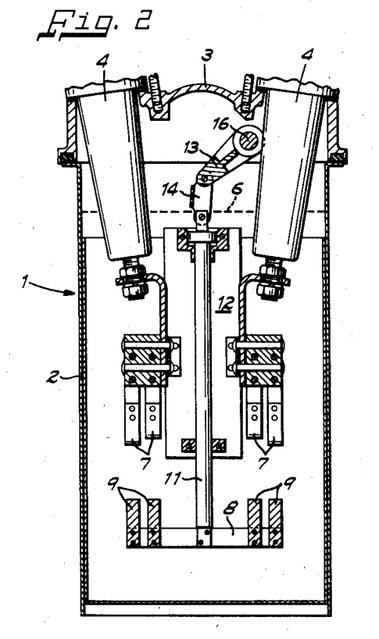
Fig. 2 is a partial sectional view of the main switch taken on the line 2—2 in Fig. 1, showing the main contacts in open circuit position.
Figure 3:
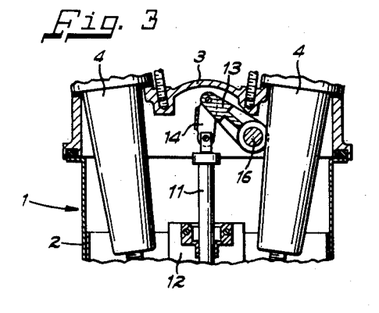
Fig. 3 represents the position of certain of the main switch components when in closed position.

A more detailed description of the main switch and actuator will now be made in reference to the drawings. In Fig. 1 will be seen a polyphase oil switch 1 comprising a tank 2 having a cover 3 which supports porcelain bushings 4 for connection to the line wires, not shown. Although the oil switch is not the primary subject of the instant application it will be described in sufficient detail for understanding its coaction with the novel switch actuator. Fig. 2 reveals that bushings 4 extend interiorly of tank 2 beneath the level 6 of a suitable dielectric ambient such as oil. To each bushing is connected a set of stationary contacts 7 which may be closed by a bridging bar 8 carrying suitable movable contacts 9. Bridging bar 8 is supported on an insulating rod 11 guided by an insulating rod guide structure 12. It is evident that vertical reciprocation of rod 11 will make and break electric contact between stationary contacts 7 and movable contacts 9.

Contact rod 11 is connected to a driving lever 13 through a straight line link 14. Lever 13 is keyed to an operating torque shaft 16 which extends lengthwise of the oil switch cover 3. Since all three sets of movable contacts 9 of the polyphase oil switch 1 are carried in a similar side by side arrangement on the torque shaft 16, it is evident that rotation of the torque shaft will open and close all phases simultaneously.

Even though the oil switch is a comparatively high inertia device, in certain installations it is imperative that its main contacts be opened and closed with utmost rapidity. Where, for example, a pair of such oil switches are used in a distribution system for quickly transferring a branch line from a preferred feeder to an auxiliary feeder, it is evident that if one switch receives an impulse indicating voltage failure on one feeder line, it is necessary to transfer to the other switch almost instantaneously if discontinuity of service to the various load elements on the line is to be avoided. The switch actuator forming the subject of the instant invention is particularly well adapted to cope with this and other switching problems.

Figures 5, 6, 7, 8:
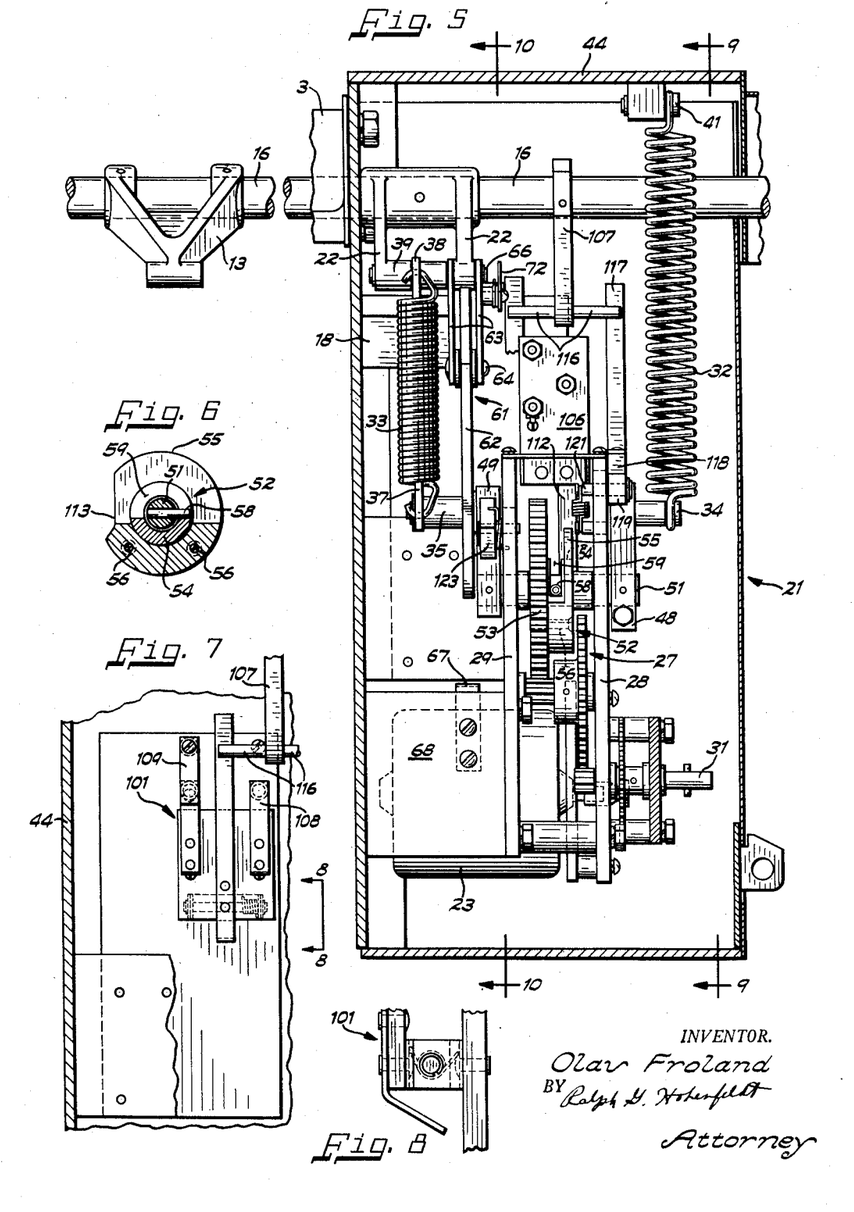
Fig. 5 represents a side view of the interior of the switch actuator mechanism depicted in Fig. 1, with parts omitted.
Fig. 6 is a sectional view of the over-running clutch looking from the rear toward the front of the actuator.
Fig. 7 is an isolated detailed fragmentary elevational view of the auxiliary selector switch contactor employed in the structure of Fig. 5.
Fig. 8 is a fragmentary side view of the selector switch contactor hinge taken on a line corresponding with 8—8 of Fig. 7.

Attention is now invited to the switch actuator 21. As stated hereinabove the particular main switch 1, in conjunction with which the structure and operation of the actuator is illustrated, is provided with a torque shaft 16 extending into the actuator 21 housing. In Fig. 5 power shaft 16 carries on its left end one of the main contact carrying arms 13 and the portion of shaft 16 extending into actuator 21 has pinned to it a lever 22 for converting the driving force of the actuator to rotation of the torque shaft 16. An operations counter 24 and a switch position indicator pointer 26 are provided at the remote actuator end of shaft 16.

The actuator is powered by a low power input, unidirectional electric motor 23 as may be seen in Fig. 5. Motor 23 drives the actuator through a speed reducing gear train 27 supported by a pair of upstanding vertical plates 28 and 29 which provide bearings for the various components of the gear train. Those versed in the art will readily perceive that the ratio of the gear train is dependent upon the speed of the motor 23 and the ultimate speed at which it is desired to operate the actuator.

Figure 9:
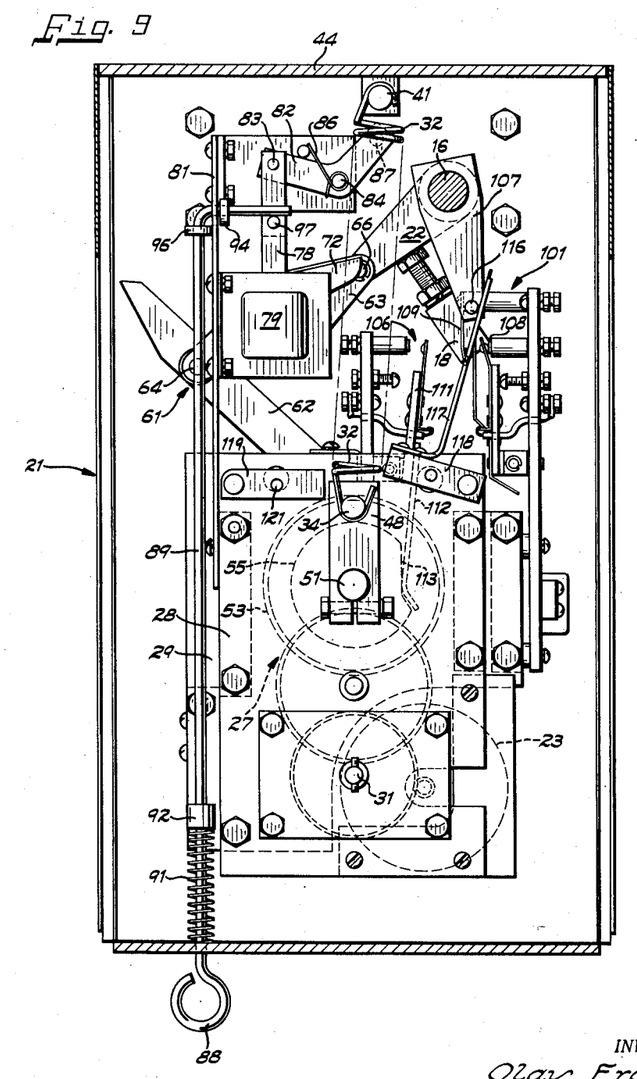
Fig. 9 is a front elevational view taken on the line 9—9 of Fig. 5, showing disposition of the actuator components when the main switch is in open circuit position.

It will be noted particularly in Figs. 5 and 9 that the gear train is also provided with a cross pinned hand crank adapter shaft 31 for engagement by a hand crank, not shown.

As stated earlier, the actuator 21 is of the stored energy type. By this is meant that there are independent spring means which simultaneously store energy provided by the electric motor 23 acting through the gear train 27. In Figs. 5 and 9 the actuator 21 is in a condition corresponding with open circuit position of main switch 1. Under these circumstances switch opening springs 33 are shown in relaxed condition and the switch closing spring 32 is shown in inactive position but extended approximately 50% of its fully extended length. The purpose of having this spring preloaded is to have enough force in the last part of the stroke to close the main switch 1. The crank arm 48 is then locked between safety latches 118 and 119. Referring to the same figures, it will be noted that the switch opening springs 33 each have one of their ends attached to a crank pin 35 through the agency of an equalizer clevis 37 capable of pivoting on the end of crank pin 35. Opposite ends of the switch opening springs 33 are likewise connected to an equalizer clevis 38 pivotally mounted on the cross bar 39 of main switch torque shaft operating arm 22. Thus, it is evident that a spring connection is established between main shaft operating lever 22 and crank pin 35 through the medium of switch opening springs 33.

In the illustrative embodiment, the switch closing spring 32 is shown as a single spring, of heavier wire than the opening springs 33, and anchored at one end to a bracket 41 at the top of housing 44. The other spring 32 end is attached to a grooved end crank pin 34 disposed in the direction of the front of housing 44.

Inviting attention to means for loading the springs 32 and 33 simultaneously, it is seen readily in Fig. 5 that, each of the crank pins 34 and 35 is affixed in the free end of a corresponding crank arm 48 and 49, respectively, rigidly fastened to a one-piece power shaft 51 so that its rotation will cause the crank pins 34 and 35 to simultaneously execute a circular orbital movement. In this illustrative embodiment, rotation of crank arms 48 and 49 is always in a clockwise direction when viewed in Fig. 9. Power shaft 51 is journalled in the pair of parallel plates 28, 29 which support the shafts of the intermediate gears comprising the speed reducing gear train 27.

Figure 11A:
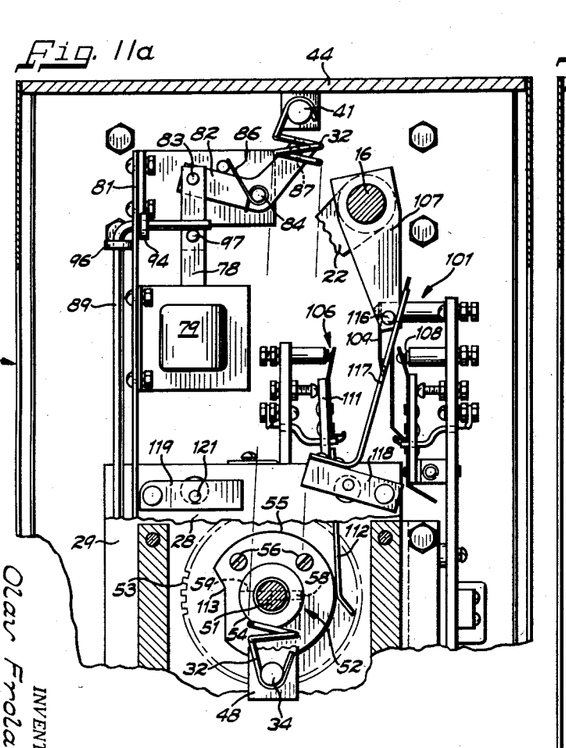
Fig. 11a is a view with parts omitted, showing the disposition of the switch actuator mechanism immediately preceding closure of the main switch driven thereby, the closing spring being fully extended.
Figure 11B:
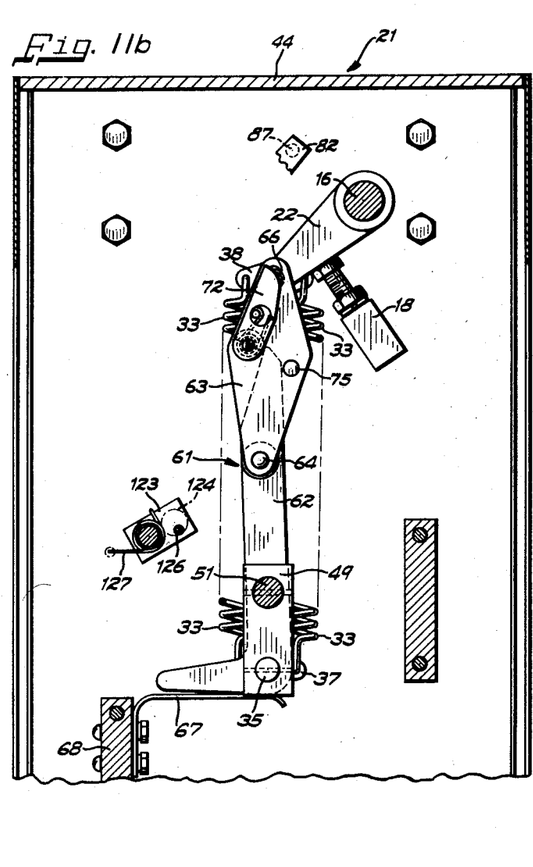

From the structure described thus far, it is evident that rotation of power shaft 51 causes crank pins 34 and 35 to execute a circular motion extending the springs 32 and 33 when the pins reach the lower position of their orbit, see Figs. 11a and 11b. It will appear shortly hereinafter how closing spring 32 is allowed to contract suddenly by the passing of crank 48 over center, thus closing the main switch 1, and further how opening spring 33 is latched in extended condition at this time, thus preparing the actuator for a switch opening operation.

For storing and releasing the energy of the springs at proper intervals, an over-running clutch arrangement is provided, designated generally by the reference numeral 52. The clutch assembly 52 comprises a power output gear 53 journalled for free rotation on power shaft 51. Integral with gear 53 is a slotted hub 54 which fits freely on power shaft 51. Surrounding the periphery of hub 54 is an auxiliary switch controlling cam 55 fixed for rotation with hub 54 by means of flat head screws 56 tapped into the face of gear 53. The mode of operation of the cam 55 will be explained more fully, but for the time being it is sufficient to realize that power gear 53, slotted hub 54 and cam 55 rotate as a unit on power shaft 51.

It will be noted particularly in Figs. 5 and 6 that power shaft 51 is provided with a roll pin 58 disposed in slot 59 of the hub 54. In Fig. 6 particularly it is clear that pin 58 is flush with one side of power shaft 51 but extends radially from its other side into slot 59. In combination, the hub 54, slot 59 and roll pin 58 constitute an over-running clutch assembly for transferring power at the proper time from the driving motor to the spring loading crank arms 48 and 49. It should be evident that 180° of clockwise rotation of hub 54 causes slot 59 to drive roll pin 58 in a clockwise direction and that thereafter through the next approximate 180° roll pin 58 is free running and rotating ahead of the hub 54. It is apparent now that shaft 51 is first slowly driven by clutch 59 while loading springs 32 and 33 and then allowed to rapidly rotate ahead of the clutch under the influence of closing spring 32 after reaching its fully extended position.

It will be noted that the switch operating lever 22 and opening spring crank arm 35 are interconnected by a toggle link member 61 in substantial force transmitting parallelism with the switch opening springs 33. Hence, when crank pins 34 and 35 execute a complete circular movement, toggle link member 61 is adapted to alternately become rigid, for maintaining opening springs 33 extended, and collapsible when it is desired to release the stored energy of the springs 33 for opening the switch.

Figure 10:
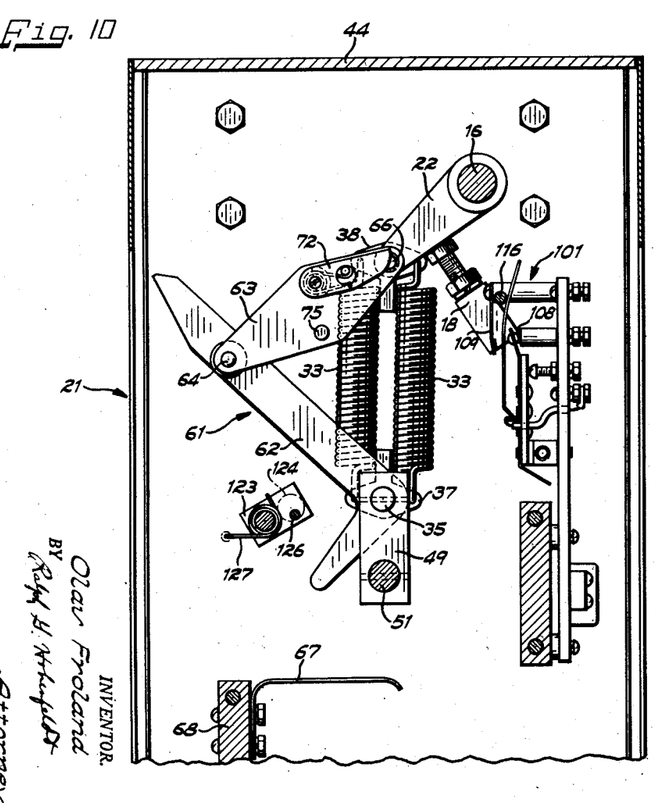
Fig. 10 is a fragmentary view of parts of the actuator mechanism obscured in Fig. 9, more particularly, the toggle link mechanism, switch opening springs, and selector switch, the view being taken on a line corresponding with 10—10 in Fig. 5.

In Figs. 5 and 10 particularly it will be observed the condition of opening springs 33 and toggle link member 61 when the main switch 1 is in open circuit position, the actuator being inactive. Here springs 32 and 33 are relaxed, cranks 48 and 49 are in their upper orbital position, main switch operating lever 22 is at an angular position below a horizontal plane passing through torque shaft 16 and the toggle link member 61 is in collapsed condition. It is apparent that the toggle member 61 consists in a pair of distinct links, the first 62 being L-shaped and pivoted near its bent extension for rotation on opening spring crank pin 35. L-shaped link 62 is also pivotally connected intermediate its ends to a second link 63 through the means of a pin 64. The second link 63 actually comprises two laterally spaced congruent link members disposed in spaced relation on each side of first link 62. The pair of second links 63 are in turn pivotally connected at 66 to switch operating lever 22 which turns torque shaft 16 into selected angular positions.

Figure 14A:
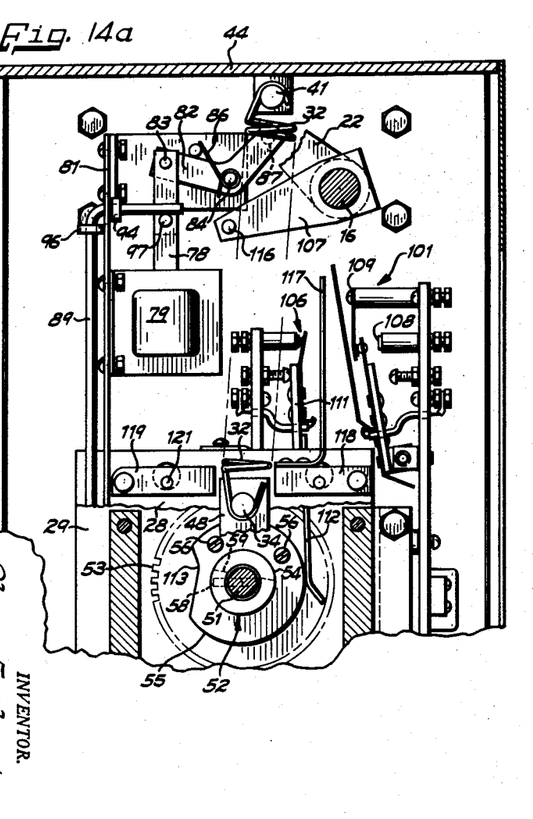
Fig. 14a is a fragmentary view, with parts omitted, showing the disposition of the principal components of the switch actuator mechanism immediately subsequent to closure of the main switch.
Figure 14B:
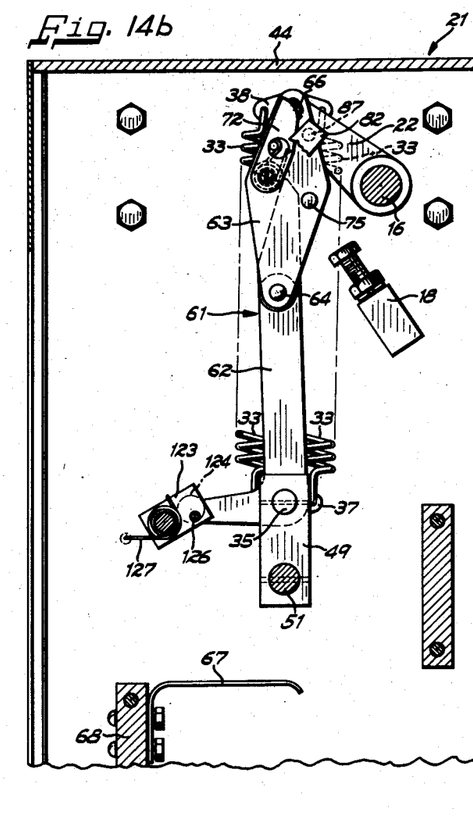

In Fig. 10 the toggle member is in collapsed condition whereas in Fig. 14b, for example, it is in rigid force transmitting condition. To accomplish this conversion from collapsed to force transmitting condition, it is evident that opening spring crank 49 may be driven by motor 23 through an angle of approximately 180° to its lower orbital position as illustrated in Fig. 11b most clearly. As is evident in the last named figure, such rotation will cause toggle member links 62 and 63 to assume a substantially aligned position with respect to each other and at the same time switch opening springs 33 will be extended a maximum amount, thereby exerting a downward force on main switch position controlling arm 22. To assure that the first L-shaped link member 62 will rock in a clockwise direction when aligning with its coacting link 63 its movement is augmented by a flat, right angular bent, back-up spring member 67 which is fixedly mounted on a post member 68 as is particularly evident in Figs. 10 and 11b. Thus, when the free end of L-shaped link 62 rotates clockwise to a position where it strikes flat spring 67 the link 62 will be rotated positively toward alignment with its coacting links 63.

Figure 12:
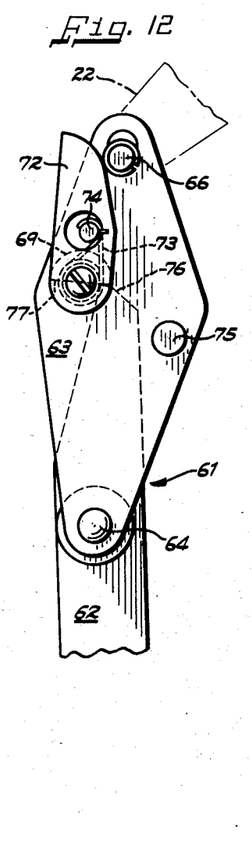
Fig. 12 represents a fragmentary detail view of the toggle link mechanism while executing a latching operation.
Figure 13:
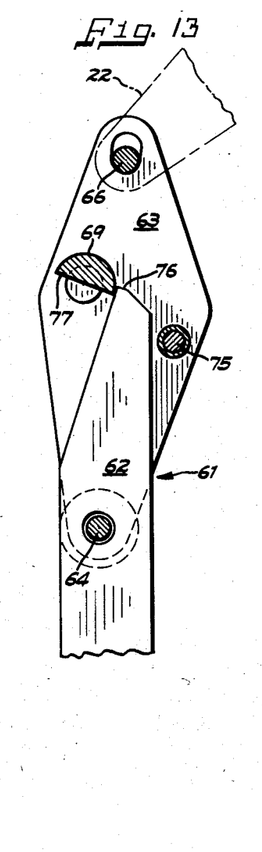
Fig. 13 represents the toggle link mechanism, with parts removed, after latching thereof has been completed.
Figure 15:
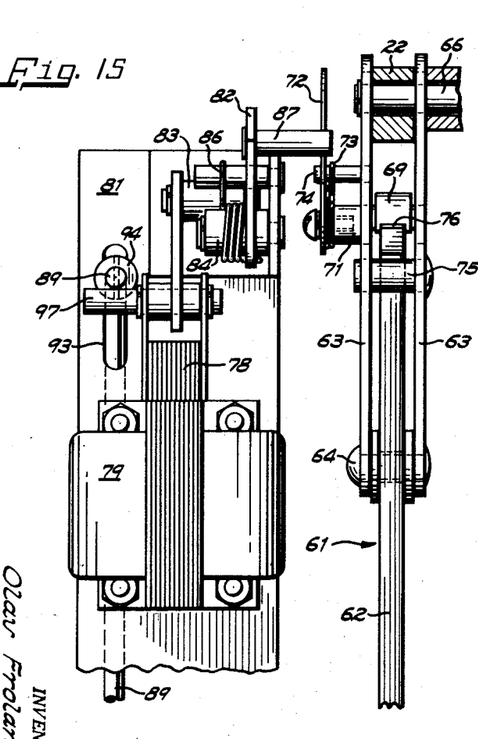
Fig. 15 represents a detail side elevational view of the switch actuator tripping means.

For holding toggle member 61 rigid so that switch opening spring 33 will remain in stored energy extended condition a toggle latch is provided. Referring to the side view of Fig. 15 it will be noted that the quick release toggle latch comprises a short semi-round shaft 69 extending through and journalled in the parallel spaced link member 63. Rigidly affixed to an extension 71 of shaft 69 is a toggle trip trigger arm 72, at all times biased in a clockwise direction when viewed from the front, by a torsion spring 73 which has one end engaging the trigger arm and another end reacting against a pin 74 fixed in link 63 and extending laterally thereof in the path of the trigger arm so that its clockwise rotation is limited. A portion of shaft 69 is semi-circular in cross section and has a face directed toward the bevelled end 76 of the first link member 62, see Fig. 13. When the toggle member is in the process of becoming a rigid member it is evident that bevelled end 76 of link 62 will strike the flat face 77 of the semi-circular shaft 69 as in Fig. 12, and rotate the trigger arm 72 through a very small counterclockwise angle in opposition to the force of helical spring 73. Hence, when bevelled end 76 swings past the flat portion 77 of semi-round shaft 69 as in Fig. 13, end 76 will lock against the outer periphery of semi-round shaft 69. Counterclockwise rotation of bevelled end 76 is prohibited by the helical spring 73 causing partial rotation of shaft 69 so that it stands in the path of end 76. Under these circumstances the toggle member is locked in force transmitting condition as in Fig. 11b but it may be easily collapsed by a slight force being applied to trigger arm 72 in a counterclockwise direction because the pressure on semi-circular periphery of shaft 69 is small on account of links 62 and 63 being in toggle position.

Before going into a detailed discussion of various components which are ancillary to operation of the switch actuator, a brief summary of the structure and mode of operation will now be made, since the structure thus far described constitutes the essential elements for opening and closing the switch. Refer to Figs. 5 and 9 where the actuator mechanism is shown in inactive condition and the main switch torque shaft 16 is in what corresponds to switch open position. Note particularly that roll pin 58, extending from power shaft 51, lies against the left side of slot 59 in hub 54 of the over-running clutch assembly. Assuming that it is desired to close the main switch, energy is supplied to electric motor 23 through a control circuit to be discussed hereinafter, thus causing power gear 53 to rotate in a clockwise direction as viewed in Fig. 9. Rotation of power shaft 51 causes crank pins 34 and 35 to swing through their circular orbit until their lowermost position is attained where both switch closing spring 32 and opening springs 33 are fully extended as in Figs. 11a and 11b respectively. This corresponds with substantially 180° rotation of power shaft and roll pin 58. During this time toggle link member 61 is extended from its collapsed condition in Fig. 10 to its rigid condition as exemplified in Fig. 11b. It should be noted that toggle link member 61 becomes rigid, slightly before 180° of rotation of cranks 48 and 49, for a reason which will shortly appear. Note in Fig. 11b that a stop pin 75 is provided which prohibits further clockwise rotation of toggle link member 61 thus causing it to become a rigid member because of its interposition between pin 75 and semi-round shaft 69. In Fig. 11a it will be noted that up until the time when springs 32 and 33 are fully extended, power shaft 51 is being driven by action of slot 59 against roll pin 58. However, as driving of power shaft 51 is continued for more than 180° closing spring crank pin 34 passes through its lowermost orbital position and travels overcenter so that crank arm 48 will be very rapidly accelerated in a clockwise direction under the influence of powerful closing spring 32. Upon this event opening spring crank arm 49 will likewise be accelerated very rapidly through rigid toggle member 61, main switch operating arm 22 will be rotated through a clockwise angular direction until it terminates in main switch closed position as indicated in Fig. 14b. At this time the main switch 1 is in closed circuit position and the switch opening springs 33 are held in extended stored energy condition for readiness when it is desired to trip the switch open by collapsing toggle member 61 through tripping trigger arm 72.

After roll pin 58 overtravels approximately 180° ahead of slot 59 and hub 54, it is evident from inspection of Fig. 14a that hub 54 continues to rotate clockwise under the influence of motor 23 until all of the free play between slot 59 and pin 58 is taken up whereupon motor 23 is disconnected and the clutch assembly is restored to its original condition illustrated in Fig. 5. By this arrangement the free play between the pin and slot is taken up while the main switch is in closed circuit position so that time will not be consumed for this purpose after the next energization of actuator motor 23. In other words, the lost motion in the over-running clutch is taken up when the time consumed doing it is immaterial and corresponds with an inactive condition of the actuator.

Although the means for acting upon trigger arm 72 of the toggle 61 for quick opening of the main switch has not yet been discussed, it is evident that when the switch is in closed position, as indicated in Fig. 14b, a slight counterclockwise rotation of trigger arm 72 will cause a rapid collapse of the toggle member 61 so that opening of spring 33 may exert a sudden counterclockwise thrust on main switch controlling arm 22 to thereby open the main switch with a snap action. A fixed adjustable stop 18 is provided for arresting the swing of arm 22.

It should be observed that when the main switch is in closed position, crank pins 34 and 35 are in their uppermost orbital position and switch closing spring 32 is extended approximately one half of its fully loaded length. This feature assures that when the main switch is closed its bridging contacts will be securely urged into electrical contact through a torsional force applied to shaft 16.

Having discussed the principal elements of the switch actuator in considerable detail, attention will now be turned to various subsidiary but important components which contribute to the operation of the actuator.

As briefly mentioned earlier, the actuator may be driven by a manual crank, not shown, which engages the shaft extension 31. In manual closing, the mode of operation of the actuator is identical to that described hereinabove except that a constant manual stress must be exerted on the shaft extension 31 until cranks 48 and 49 have rotated through 180° and closing spring 32 has passed its overcenter position, whereupon it will complete the closing operation under the influence of its own stored energy. Although the closing action is sudden, no sharp impact or mechanical shock will be felt by the operator who holds the crank in his hand.

The actuator may be tripped to main switch 1 open position by either electrical or manual means. Electrical tripping is accomplished by acting on toggle tripping trigger arm 72 by a solenoid coil having an armature plunger 78 which responds to its coil's 79 energization. In Figs. 9, 11a, 14a and 15 it will be noted that solenoid 79 is bolted to a vertical supporting plate 81. At the free end of reciprocating armature plunger 78, one arm of a bell crank 82 is pivotally connected by a pivot pin 83. The intermediate pivot shaft 84 of bell crank 82 is surrounded with a torsion spring 86 which tends to urge bell crank 82 in a clockwise direction and exerts a lifting force on armature 78. At the free end of bell crank 82 a tripping pin 87 extends laterally. When toggle member 61 is in rigid condition, corresponding with main switch closed position, it will be evident that toggle trip trigger arm 72 will be in close proximity with lateral tripping pin 87 extending from bell crank 82. Obviously, downward plunging of armature 78 will cause bell crank 82 to rotate counterclockwise until it strikes trigger arm 72, thereby effecting sudden collapse of the toggle member 61 and opening main switch 1. Removal of the electrical impulse from the solenoid coil 79 will permit restoration of the armature in its uppermost postion under the action of torsional spring 86.

Manual tripping of the actuator for opening main switch 1 is accomplished by engaging a ring 88 at the end of a vertically extending rod 89 by the agency of a hookstick, not shown. Pulling the ring downwardly opposes the restoring force of a coil spring 91 which surrounds the rod and is interposed between the bottom of housing 44 and a rigidly affixed collar 92. Guidance for vertical movement of the manual actuating rod is obtained by passing the bent end of the rod through a slot 93 in supporting plate 81. Manual trip release rod 89 is further guided by means of a permanently fixed collar 94 on one side of vertical supporting plate 81 and another vertical collar 96 on the other side thereof. The horizontally bent free end of manual trip rod 89 extends over and in contact relation with a laterally extending pin 97 carried by armature plunger 78. It is evident that the result of a downward pull on rod 88 by means of a hookstick, not shown, is the same as if the solenoid coil 79 had been energized to pull armature plunger 78 down. It is to be further noted that one means of tripping is effective as and independent of the other regardless of whether electric power is available for energizing the solenoid trip coil.

Figure 17:
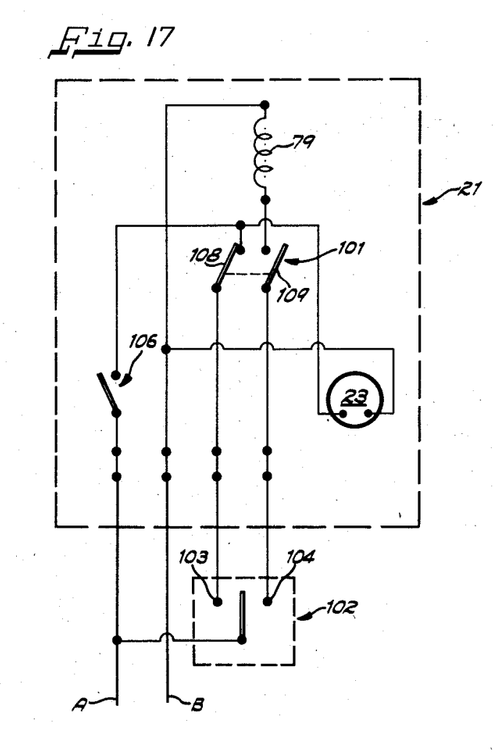
Fig. 17 is a circuit diagram for the first embodiment of the invention.

The electric auxiliary switches necessary for controlling operation of driving motor 23, together with their associated parts, will now be described in conjunction with Figs. 9, 10, 11a, 14a and wiring diagram Fig. 17. The auxiliary switches in Fig. 17 correspond with the actuator conditions of Fig. 9 when the main switch is open. In the schematic representation of Fig. 17 the actuator 21 is shown being controlled by a single pole double-throw control switch 102 provided with close and trip contacts 103 and 104, respectively. Within the actuator 21 are two separate auxiliary switches, the first is denominated a holding switch 106 and the second is a two pole double-throw selector switch 101. Selector switch 101 is shifted from the right hand position of Fig. 17 to a left hand position in accordance with the angular position of selector control lever 107 carried by torque shaft 16 in the actuator 21. In the diagram, if the control switch 102 is caused to energize the closing circuit, through contact 103, it will be evident that current will pass from line A through selector switch finger 108, through the motor 23, and return to the solidly connected line B. In order to avoid having to hold switch station 102 while the actuator 21 performs a complete cycle of operation, a holding switch 106 is connected in parallel with the close circuit. When the contact 103 of control switch 102 is closed momentarily, motor 23 immediately begins to operate and rotate cam 55 attached to power gear 53 of the actuator through a small angle, but sufficiently to close holding switch 106. If the control switch is then released to neutral position, electrical continuity through the driving motor will be maintained by the holding switch 106 until the actuator has completed its cycle of operation.

Holding switch 106 is spring biased toward open position and is constructed somewhat similarly to the detailed pivot support shown in Fig. 8 which illustrates that of the auxiliary selector switch 101. Holding switch 106 is operated by cam 55 through a bar follower 112 which extends from the holding switch clapper arm 111 into a cut-away chord 113 in the periphery of cam 55 as viewed in Fig. 9. Upon slight rotation of cam 55, follower 112 will be urged in a counterclockwise direction to close the holding switch contacts as depicted in Fig. 14a. Anytime the follower 112 bears upon the circular periphery of cam 55 the holding switch 106 will be closed. As implied above, the holding switch is maintained in closed position even after the closing spring 32 is fully extended or has operated to close the main switch contacts 7 and 9, so that all the free play between slot 59 of hub 54 and roll pin 58, carried by power shaft 51, will be taken up. Thus, the switch is placed in condition for commencing to store energy in springs 32 and 33 immediately after receiving a closing impulse, without lost motion occurring.

Auxiliary selector switch 101 comprises two mechanically simultaneously movable contact fingers 108 and 109 whose function it is to close the motor circuit, or alternatively, the circuit to the opening trip coil 79, according to the position of the main switch contacts. Fig. 9 shows a side elevation of auxiliary selector switch 101 and Fig. 7 a front view thereof. It will be observed that the positioning of the contact fingers 108 and 109 is controlled by a cross pin 116 carried by lever arm 107 which is rigidly affixed to the main torque shaft 16. Thus, in Fig. 9 where the main switch is open, corresponding with wiring diagram, Fig. 17, short finger 108 is in closed circuit position for completing the electric motor circuit. Whereas, in Fig. 14a depicting the main switch in closed position, cross pin 116 has swung out of the way to permit the longer finger 109 to contact, thereby closing the circuit to the trip coil solenoid 79. Thus, auxiliary selector switch 101 conditions the actuator for either closing or opening operations.

Cross pin 116, see Fig. 5, carried by lever arm 107, extends laterally to not only control auxiliary contactor 101 but also to react against an upstanding arm 117. The purpose of arm 117 is to remove a special safety latch 118 out of the path of the closing crank 48 when the switch actuator is in condition for commencing a closing operation. In Fig. 14a it is evident that safety latch 118 stands in the way of crank 48 when the main switch is in closed position. Another pivotally mounted anti-rotation safety latch 119 is provided at the left side of the closing crank 48. This latch is capable of executing very limited counterclockwise rotation by reason of it being provided with a pin 121 which extends laterally into a hole of limited diameter in plate 28. It is evident in Fig. 9 that crank arm 48 may rotate clockwise past anti-rotation safety latch 119 although counterclockwise rotation would be prevented thereby.

It is to be appreciated that the actuator is intended for use where electrical duty is particularly rigorous. Hence, it is to be expected that occasionally attempts will be made to close in the main switch 1 by means of the actuator 21 while very heavy magnitude currents are flowing during making of the main switch contacts 7 and 9. Under such circumstances tremendous opposing magnetic and mechanical forces may be developed which would tend to trip back or partially overcome the energy of the closing spring 32. To assure that this contingency can take place without harmful consequences, an additional anti-kick back safety latch 123 is provided. In Fig. 5, the anti-kick back latch 123 is shown pivotally carried on the back side of plate 29 and in alignment with the rotational path of opening spring crank 49. In Fig. 14b plate 29 is shown to have a hole 124 into which a pin 126 carried by the latch laterally extends. The pin 126 in combination with hole 124 limits the counterclockwise rotation of the latch. A torsional spring 127 is provided for biasing the latch in a clockwise direction as viewed in Fig. 14b. During a normal closing cycle of the actuator, it is evident that closing spring crank 49 will freely pass spring biased latch 123 and normally the main switch contacts will be closed and held in that position under the influence of the partially preloaded closing spring 32.

Figure 4:
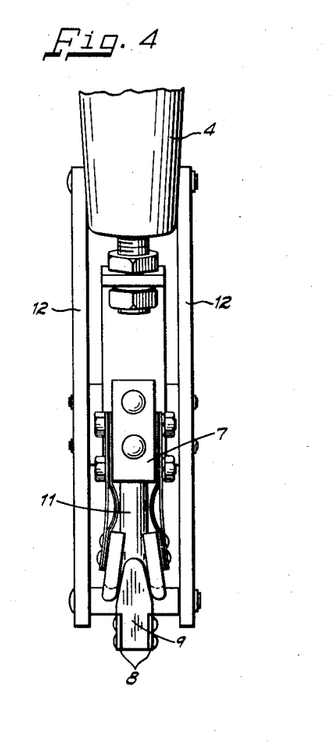
Fig. 4 is a side elevational view of the main switch contacts, in closed position.

Assuming that main switch 1 is closing under heavy short circuit current, the electromagnetic forces might be so great that the main switch moving contacts 9 will not fully engage with stationary contacts 9. In that case, arm 48 would not lock between safety latches 118 and 119 but arm 49 will pass by anti-kick back latch 123 which will restrain the arm 49 and indirectly prevent main contacts 7 and 9 from separating. Although latch 123 appears to be of rather short radius, in the illustrative embodiment here shown, crank arm 49 would be restrained from counterclockwise movement by the latch if control lever 22 rotated through a mere 10°, where the parts are proportioned as here shown. Transferring this angular rotation of control lever arm 22 in Fig. 14b to Fig. 2 where the same movement is converted to a linear motion of the movable contacts 9 it will be seen that the corresponding rectilinear motion of the contacts would amount to only a small amount, appreciably less than the wiping action occurring between movable contacts 7 and stationary contact 9 as is evident in Fig. 4.

The structure of the invention thus far described is characterized in part by its capability of instantaneously tripping open in response to an electrical signal supplied to a trip coil. However, from the description, it should be evident that preparing the actuator for closing the main switch contacts involves some time delay during which energy is stored simultaneously in the closing and opening springs.

Figure 16:
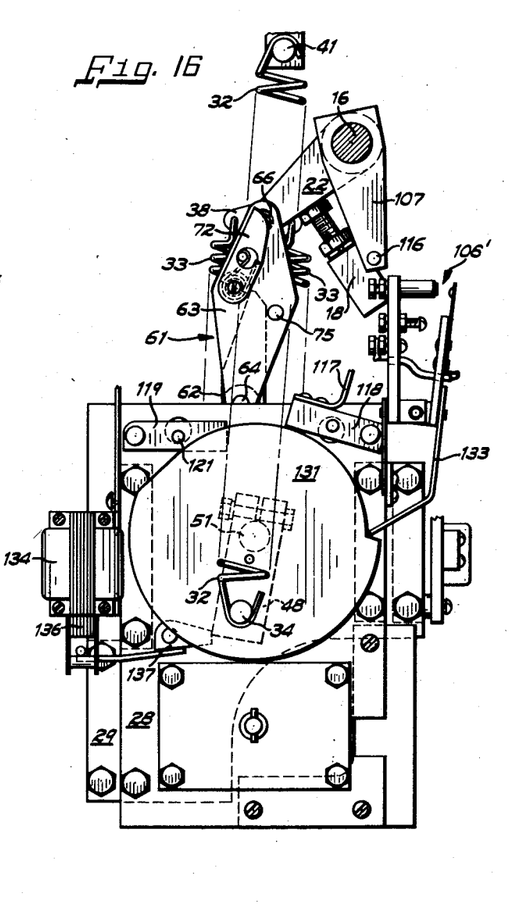
Fig. 16 is a view showing the essential components of an alternative embodiment of the invention.

An actuator modified for both instantaneously closing and opening the main switch contacts immediately following application of an appropriate control signal to a trip coil is shown in Fig. 16. In this embodiment, the elements necessary for quick tripping to open position, namely, the toggle member, opening springs, and the opening solenoid together with its associated parts, remain substantially unchanged. However, the elements associated with the switch closing operation of the actuator are modified so that when the main switch is open, the actuator automatically stores energy in its closing spring and opening springs, and upon energization of a closing trip solenoid allows the main switch to close without time delay.

In Fig. 16 it will be observed that closing spring 32 and opening springs 33 are fully extended. Opening springs 33 are restrained in extended condition by the rigidity of toggle link member 61. Thus, toggle member 61 is ready to drive torque shaft 16 by action on drive arm 22 but such action cannot occur because crank 48 is restrained against further revolution by detent 137 interposed in its path. When instantaneous closing of main switch 1 is desired, a signal is delivered to a quick-closing solenoid 134, which through its plunger 136, retracts detent 137 from the path of crank 48 so that it is free to swing under the influence of closing spring 32, thereby closing main switch 1.

Figure 18:
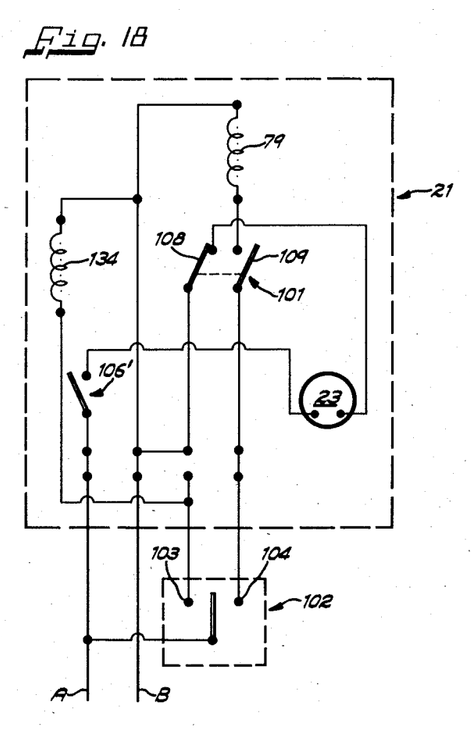
Fig. 18 is a circuit diagram for the alternative embodiment of the invention.

The wiring diagram of Fig. 18 corresponds with the actuator as depicted in Fig. 16. It will be noted that holding switch 106' is now in open position so that motor 23 is de-energized. However, in order to drive the actuator to the position of Fig. 16, a cam 131 is provided which operates holding switch 106' through a follower finger 133. Immediately following the last trip open of the actuator, crank 48 and cam 131 were rotated 180° so that follower 133 was acted upon by the circular portion of cam 131, thus closing holding switch 106' and completing the motor circuit through contact 108 of selector switch 101. This drives the cam 131 to the position shown in Fig. 16 where follower 133 has dropped into the lesser radius portion of the cam after the closing spring has been loaded. The motor is de-energized by opening of switch 106'.

In Fig. 18 it is evident that closing of contact 103 in control station switch 102 will energize closing trip coil 134 for retracting detent 137. Upon this event selector switch 101 will swing to open contact 108 and close 109 to the opening trip coil 79. The actuator may then be tripped open by closing contact 104 of control station switch 102 so as to complete the circuit through trip coil 79. After tripping open the cycle will be repeated where motor 23 runs until closing spring 32 and opening springs 33 are loaded and the motor is stopped by cam 131 acting on switch 106' The actuator is then prepared for another instantaneous closing operation.

Although the two forms of the actuator have been illustrated as being controlled by a single pole double-throw switch, it is also possible to substitute therefor the contacts of any voltage or current sensitive device through which it is desired to control the operation of the actuators.

It is worth noting that control power failure will not cause the actuator or main switch to shift its position nor will it impair manual operation because the arrangement of the parts is such that the manual operating means are independent and non-interfering with the unidirectional motor driven means.

In the foregoing discussion it is seen that a novel and highly simplified yet effective switch controlling actuator has been described. The switch features safe, low voltage control, the loading of both opening and closing springs simultaneously, rapid tripping features regarding both opening and closing operations, and equally effective manual or electrical operation of the actuator without interference of one by the other.

Although this invention has been described in considerable detail, it is to be understood that such description is intended as illustrative rather than limiting, as the invention may be variously embodied and is to be interpreted by the true spirit of the claims.

It is claimed:

1. A switch construction including a shaft rotatable to switch closed and switch opened positions, actuator means for operating said shaft, said actuator means comprising, a crank revoluble to first and second positions, means for driving said crank to second position, a switch closing spring attached at one end to said crank and fixedly anchored at its other end, an arm affixed to said shaft, a switch opening spring connected between said arm and said crank for extending simultaneously with said closing spring when said crank is rotated toward said second position, a toggle member including a pair of links pivotally connected to each other and pivotally connected at their remotely opposite ends to said arm and crank respectively and in substantial force transmitting parallelism with said opening spring, said links being pivoted at an angle with respect to each other when said crank is in first position and substantially aligned with each other when said crank revolves toward second position, spring biased latch means carried by the toggle member for engaging and locking said links when they become substantially aligned, a clutch means releasing said crank from said driving means when the crank revolves to second position, whereupon said closing spring rapidly turns said crank to first position after attaining second position under the action of said driving means and said arm is driven by said toggle member to actuate said switch shaft.

2. A switch construction including a switch shaft rotatable to switch closed and switch opened positions, actuator means for operating said shaft comprising a uni-directional power shaft having a crank thereon, driving means for rotating said power shaft and said crank to a second angular position from a first angular position, over-running clutch means interposed between said driving means and power shaft for imparting a relatively slow angular motion to said crank during a first approximate half revolution and allowing a free turning quick motion of said power shaft during a second half revolution thereof, a switch closing spring having one end anchored and the other connected to said crank for receiving and storing energy therefrom during the first half revolution and for rapidly imparting its energy to said power shaft during said second half revolution, an arm on said switch shaft, a switch opening spring connected between said arm and crank for simultaneously receiving energy with said closing spring during said first half revolution, a toggle member including pivotally connected links connected in substantial force transmitting parallelism with said opening spring, said toggle member including a latch adapted to lock said links with respect to each other when said crank revolves to its second position, whereby said toggle member may rapidly transmit the force of said closing spring to said arm during said second half revolution.

3. A switch construction including a switch shaft rotatable to switch closed and switch opened positions, actuator means for operating said switch shaft comprising a uni-directional power shaft having a crank thereon, an operating arm means on said switch shaft, a switch closing spring having its one end anchored and its other end attached to said crank, a switch opening spring connecting said operating arm means and crank together, means driving said crank through a circular path for simultaneously extending said springs and storing energy in each of them, over-running clutch means operatively connecting said driving means and power shaft during approximately a first half-revolution while storing energy in said springs and for releasing said power shaft for free, quick acting rotation during approximately a second half-revolution under the influence of said closing spring, an extensible member including link means adapted to be extended with respect to each other simultaneously with extension of the opening spring and connected in substantial force transmitting parallelism with said opening spring, latch means effecting interlocking of said link means when said link means are extended, whereby said extensible member may transmit the stored energy from said closing spring to said operating arm means and maintaining the extension of said opening spring during said second half-revolution.

4. A switch construction including a switch shaft rotatable to switch closed and switch opened positions, actuator means for operating said shaft, said actuator means comprising a crank means revoluble to first and second positions and including a power shaft carrying said crank arm, motor means, an over-running clutch operatively interposed between the motor means and power shaft to drive said power shaft from a first angular position during an approximate first half-revolution and to permit free rotation thereof from second angular position during a second half-revolution, a switch opening and a switch closing spring each being connected at one end to said crank for simultaneously storing energy in each of them during said first half-revolution, said opening spring also being operatively connected with said switch shaft and said closing spring being anchored at one end, detent means effectively in the path of and arresting the motion of said crank after said first half-revolution in opposition to energy stored in said closing spring, an extensible member operatively connected between said switch shaft and said crank in substantial force transmitting parallelism with said opening spring, said extensible member including inseparable link means adapted to be extended with respect to each other simultaneously with the extension of said opening spring by rotation of said crank, latch means effecting interlocking of said link means when they are extended, said extensible member being latched in force transmitting condition substantially coincident with attainment of second position by said crank, means for inactivating said motor means prior to said crank means encountering said detent, and means for retracting said detent from the path of said crank whereby said crank may execute a quick second half-revolution under the influence of said closing spring.

5. An actuator for rotating a switch operating member between switch closed and switch opened positions, said actuator comprising motor means, crank means revoluble between first and second angular positions by said motor means, a switch closing spring connected to said crank for being loaded by rotation of said crank to said second position, a switch opening spring and an operative connection to said switch shaft, said opening spring being connected between said operative connection and said crank for being loaded simultaneously with said closing spring, an extensible member including inseparable elements movable relative to each other from contracted to extended condition and respectively oppositely connected to said crank and operative connection, said elements being extended by said crank revolving to said second position, and latch means adapted to interlock said elements when they are extended to thereby effect a rigid member in mechanical parallelism with said opening spring, whereby said switch shaft is driven through the agency of said rigid member by means of said closing spring rotating said crank from second to first position.

6. The invention according to claim 5 wherein the closing spring is pre-loaded when said crank is in first position and additional energy is stored in said spring by rotation of said crank into second position, whereupon the closing spring is restored to pre-loaded condition after it yields its additional energy through rotation of said crank from second to first position.

7. The invention set forth in claim 5 wherein said extensible elements comprise a pair of toggle links and including means for releasing said latch means to thereby effect quick contraction of said extensible member under the influence of said opening spring, whereby said switch shaft is rotated to switch open position.

8. The invention according to claim 7 wherein the latch releasing means comprises electromagnetic means including an armature, means operatively coupled with said armature for movement therewith to operate said latch means, and manually controlled means operatively connected with said armature for moving the same to cause operation of said latch releasing means.

References Cited in the file of this patent

UNITED STATES PATENTS

| | | |
|---|---|---|
| 1,612,483 | Wilkins | Dec. 28, 1926 |
| 1,938,408 | Thumim | Dec. 5, 1933 |
| 2,671,141 | Weinfurt | Mar. 2, 1954 |